United States Patent Office.

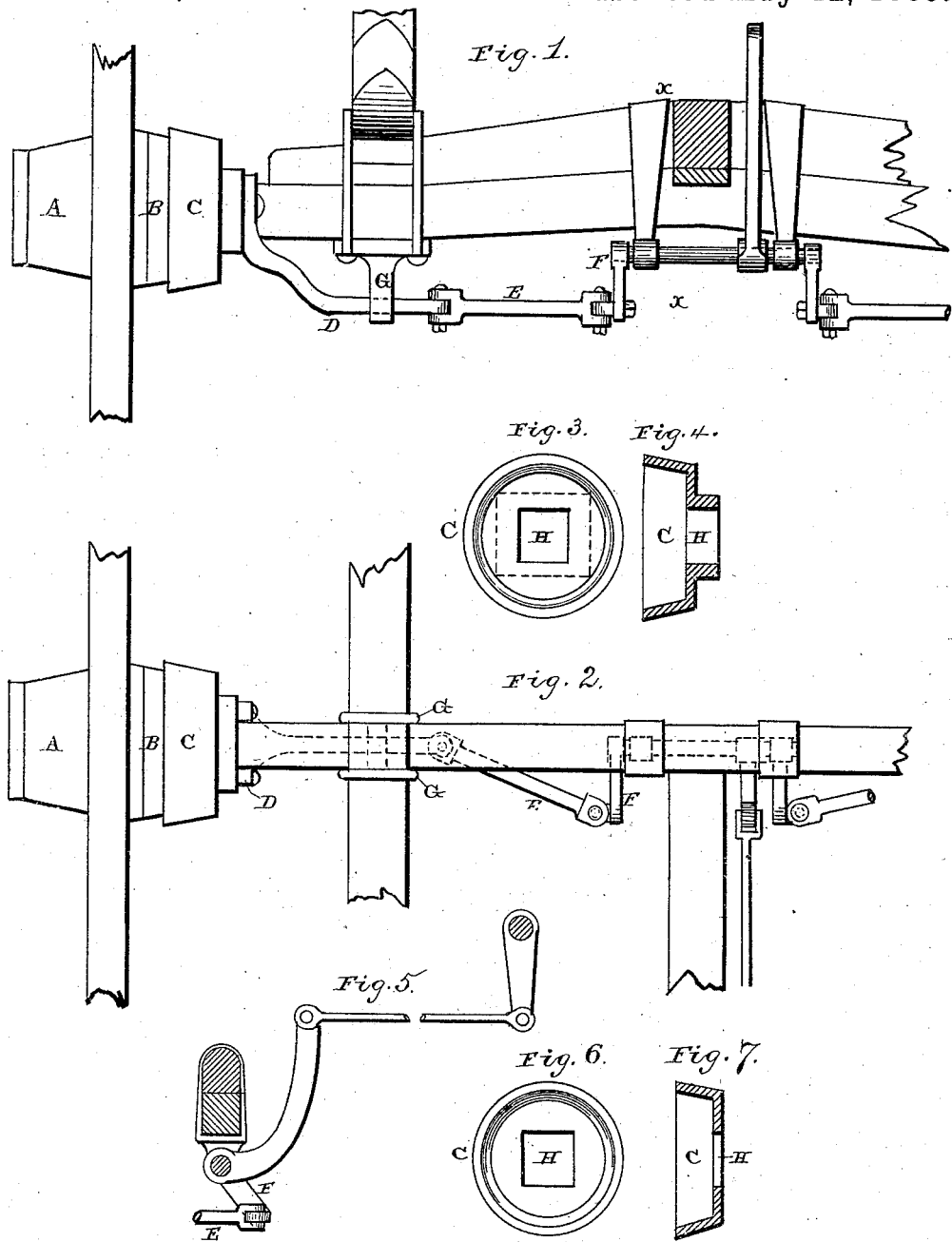

JACOB MEYER, OF PITTSBURG, AND HENRY BIER, OF ALLEGHENY, PA.

WAGON-BRAKE.

SPECIFICATION forming part of Letters Patent No. 317,831, dated May 12, 1885.

Application filed August 29, 1884. (No model.)

*To all whom it may concern:*

Be it known that we, JACOB MEYER and HENRY BIER, citizens of the United States, residing, respectively, at Pittsburg and Allegheny, in the county of Allegheny and State of Pennsylvania, have invented certain new and useful Improvements in Wagon-Brakes, of which the following is a specification, reference being had therein to the accompanying drawings.

Our invention relates to an improvement in wagon-brakes; and it consists in the application of a conical cap or shoe to the rear end of the hub of a wheel, which cap or shoe can be pushed onto the hub or removed from it by means of levers controlled by the driver to retard the motion of the wheel, entirely check it, or set it free, as will be fully described hereinafter.

The wagon-brakes now in common use are applied to the tires or circumference of the wheels, and controlled by levers. When the wheels move steadily on the axles without yielding to either side when in motion, this kind of brakes may answer their purpose; but when the axle is somewhat worn and the wheels cease to move steadily the old brakes cause a great strain on the spokes in the hubs, as may be readily seen on examining the wheels on wagons used for heavy loads, or that are broken down under their burdens. The spokes are generally broken at the hubs, and this is caused by the vacillation of the wheel under the pressure of the brake. We have discovered that by applying the brake to the hub, instead of to the tire of the wheel, the motion of the wheel is not only retarded or checked, but it is also steadied, and the heavy strain on the spokes greatly lessened.

The accompanying drawings represent our invention.

Figure 1 is a front view; Fig. 2, a plan. Figs. 3 and 4 are details of cap; Fig. 5, a cross-section through the line *x;* Figs. 6 and 7, other details of cap.

The rear part of the hub A, slightly coniform, is surrounded by a band, B, firmly attached, so as to form a part of the hub. The band ought to be wide enough to nearly cover the hub from the spokes to its rear end, and be made of steel or a material not liabe to abrade by friction.

Nearly in contact with the rear end of the hub is a coniform cap, C, that clasps the hub when pressed onto its end. The shoe C is attached to a lever, D, that is supported under the axle by a clip, G, and held so as to prevent its coming in contact with the axle that passes through the opening H in the cap or shoe.

The lever D, in connection with the rod E and crank-lever F, serve to push the cap on the hub or to remove it from it and hold it in any position under the control of the driver.

This brake is applicable to all kinds of vehicles, and, not being exposed to view, has many advantages over the ones now in use.

Having thus described our invention, we claim—

In a wagon-brake, the combination of the hub, the cap or shoe C, movable on the axle, rods D E, crank F, and an operating mechanism for moving the crank, substantially as set forth.

In testimony whereof we affix our signatures in presence of two witnesses.

JACOB MEYER.
HENRY BIER.

Witnesses:
LOUIS MOESER,
TG. STAUFFER.